United States Patent
Otsuji et al.

(10) Patent No.: US 12,525,794 B2
(45) Date of Patent: Jan. 13, 2026

(54) NETWORK SYSTEM AND CONTROL METHOD OF NETWORK SYSTEM

(71) Applicants: TOHOKU UNIVERSITY, Sendai (JP); FURUKAWA ELECTRIC CO., LTD., Tokyo (JP)

(72) Inventors: Taiichi Otsuji, Miyagi (JP); Katsumi Iwatsuki, Miyagi (JP); Hirohito Yamada, Miyagi (JP); Masafumi Yashima, Miyagi (JP); Masakazu Matsui, Tokyo (JP); Hiroyuki Koshi, Tokyo (JP)

(73) Assignees: TOHOKU UNIVERSITY, Sendai (JP); FURUKAWA ELECTRIC CO., LTD., Tokyo (JP)

( * ) Notice: Subject to any disclaimer, the term of this patent is extended or adjusted under 35 U.S.C. 154(b) by 281 days.

(21) Appl. No.: 18/334,014

(22) Filed: Jun. 13, 2023

(65) Prior Publication Data

US 2023/0327431 A1    Oct. 12, 2023

Related U.S. Application Data

(63) Continuation of application No. PCT/JP2021/047851, filed on Dec. 23, 2021.

(30) Foreign Application Priority Data

Jan. 4, 2021   (JP) .................. 2021-000251

(51) Int. Cl.
*H02J 1/00* (2006.01)
*H01Q 21/00* (2006.01)

(52) U.S. Cl.
CPC .............. *H02J 1/00* (2013.01); *H01Q 21/00* (2013.01)

(58) Field of Classification Search
CPC ...... H02J 1/00; H02J 2203/10; H02J 2310/10; H02J 13/00022; H01Q 21/00;
(Continued)

(56) References Cited

U.S. PATENT DOCUMENTS 9,197,068 B2 * 11/2015 Nuqui ...................... G06F 1/26
2015/0294813 A1   10/2015 Abe et al.
(Continued)

FOREIGN PATENT DOCUMENTS

JP        2016-63718 A     4/2016
JP        2019-161706 A    9/2019
(Continued)

OTHER PUBLICATIONS

International Search Report issued Mar. 22, 2022 in PCT/JP2021/047851, filed on Dec. 23, 2021, 2 pages.

*Primary Examiner* — Rexford N Barnie
*Assistant Examiner* — Thai H Tran
(74) *Attorney, Agent, or Firm* — Oblon, McClelland, Maier & Neustadt, L.L.P.

(57) ABSTRACT

A network system includes: a wireless base station configured to relay communication performed by wireless terminals; distributed antennas each being configured to be connected to the wireless base station and form a cell that enables communication with the wireless terminals; direct-current grids each being arranged in a predetermined form in a communication area formed by the cells and configured to interchange power with power devices connected to the subject direct-current grid; a power gate arranged between the direct-current grids located adjacent to each other and configured to interchange power between the adjacent direct-current grids; and a control device configured to control the power gate based on information acquired from the power devices via the distributed antennas. The power (Continued)

devices connected to the direct-current grids are configured to perform communication with the control device via the distributed antennas that form the communication area including the direct-current grids.

7 Claims, 11 Drawing Sheets

(58) Field of Classification Search
 CPC .......... H04Q 2209/25; H04Q 2209/43; H04Q 2209/60; H04Q 9/00
 See application file for complete search history.

(56) References Cited

U.S. PATENT DOCUMENTS

| | | | |
|---|---|---|---|
| 2016/0066285 A1* | 3/2016 | Shoji | H04W 52/267 455/522 |
| 2016/0218516 A1* | 7/2016 | Kobayashi | G05B 19/10 |
| 2018/0278091 A1 | 9/2018 | Fukasawa et al. | |

FOREIGN PATENT DOCUMENTS

| | | |
|---|---|---|
| WO | WO 2013/172088 A1 | 11/2013 |
| WO | WO 2014/061259 A1 | 4/2014 |
| WO | WO 2016/072442 A1 | 5/2016 |

* cited by examiner

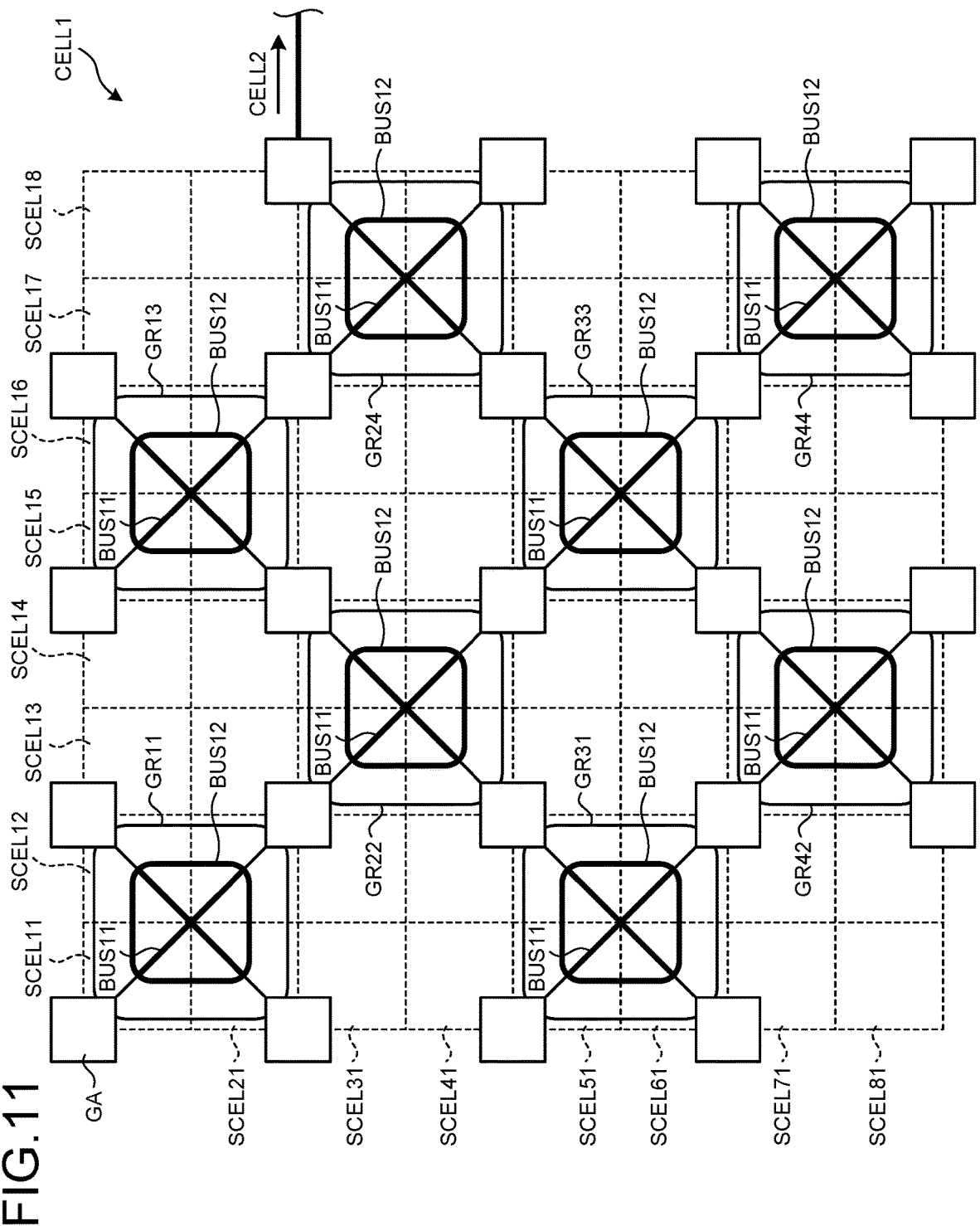

NETWORK SYSTEM AND CONTROL METHOD OF NETWORK SYSTEM

This application is a continuation of International Application No. PCT/JP2021/047851, filed on Dec. 23, 2021 which claims the benefit of priority of the prior Japanese Patent Applications No. 2021-000251, filed on Jan. 4, 2021, the entire contents of which are incorporated herein by reference.

BACKGROUND

The present disclosure relates to a network system and a control method of a network system.

Smart city and compact city that realize Society 5.0 that highly integrates cyberspace and physical space of a cyber physical system (CPS) is expected to increase efficiency and sophistication of functions and services provided by cities and regions and achieve both of solution to social problems, such as decarbonization, as a society aim and economic development due to transformation of industrial structures using digital transformation or the like.

Reflecting an increase in investing (ESG investing) that considers three factors, such as environment, social, and governance, or adoption of "the 2030 Agenda and the 17 Sustainable Development Goals (SDGs)" that was adopted in September 2015 at the United Nations Summit, the number of members of Renewable Energy 100% (RE100) in which only companies that have claimed to perform business operation by using only renewable energy may join is increasing.

It is estimated that a world smart city market cumulatively reaches a scale of 3100 trillion yen in 20 years from 2010 to 2030, and, in energy-related markets that play a central role, it is expected to achieve a market scale of about 720 trillion yen in relation to smart grids, a market scale of about 310 trillion yen in relation to a next-generation vehicle, such as an electric vehicle, and a market scale of about 380 trillion yen in relation to renewable energy. Therefore, smart city development plans are promoted in a large number of countries and regions, and some of the plans are already put into practice.

International Publication NO. WO2013/172088 proposes a system that connects distributed energy resources including solar power, wind-power generation, storage batteries, and power storage systems, social infrastructures including EVs and charging stations, a home energy management system (HEMS), a building energy management system (BEMS), and power plants to one another by communication grids and power grids.

Furthermore, to compensate for power shortage in the power grids, a power network system disclosed in International Publication NO. WO2013/172088 is known as the disclosure for flexibly interchanging power among a plurality of power cells, for example. The power cells disclosed in International Publication NO. WO2013/172088, include loads, such as houses and buildings, power generation facilities, such as solar panels and wind generators, power storage facilities, such as storage batteries, and power routers. The power routers are connected to a bulk power system that transmits power from power routers of different power cells or power plants. The power router of each of the cells is connected to a management server via a communication network, and power is flexibly interchanged among the power cells under the control of the management server.

SUMMARY

In the power network system disclosed in International Publication NO. WO2013/172088, the power routers are integrally controlled, so that if a failure occurs between the power routers and the management server due to a disaster or the like, it becomes impossible to flexibly interchange power among the power cells. By adopting autonomous distributed control, it becomes possible to cope with the failure; however, it is difficult to optimize the entire system and interchange the power by only the autonomous distributed control, and therefore, a technique for increasing resilience is needed.

There is a need for a technique for increasing resilience in a network in which a power network and a communication network are integrated.

A network system according to one aspect of the present disclosure includes: a wireless base station configured to relay communication performed by wireless terminals; a plurality of distributed antennas each being configured to be connected to the wireless base station and form a cell that enables communication with the wireless terminals; a plurality of direct-current grids each being arranged in a predetermined form in a communication area formed by the plurality of cells and configured to interchange power with a plurality of power devices connected to the subject direct-current grid; a power gate arranged between the direct-current grids located adjacent to each other and configured to interchange power between the adjacent direct-current grids; and a control device configured to control the power gate based on information acquired from the power devices via the distributed antennas, wherein the power devices connected to the direct-current grids are configured to perform communication with the control device via the distributed antennas that form the communication area including the direct-current grids.

BRIEF DESCRIPTION OF THE DRAWINGS

FIG. 11 is a diagram illustrating arrangement of mesh-shaped direct-current grids.

DETAILED DESCRIPTION

Embodiments of the present disclosure will be described in detail below based on the drawings. The present disclosure is not limited by the embodiments described below. In addition, in the description of the drawings, the same or corresponding components are appropriately denoted by the same reference symbols.

EMBODIMENT

Figure 1:
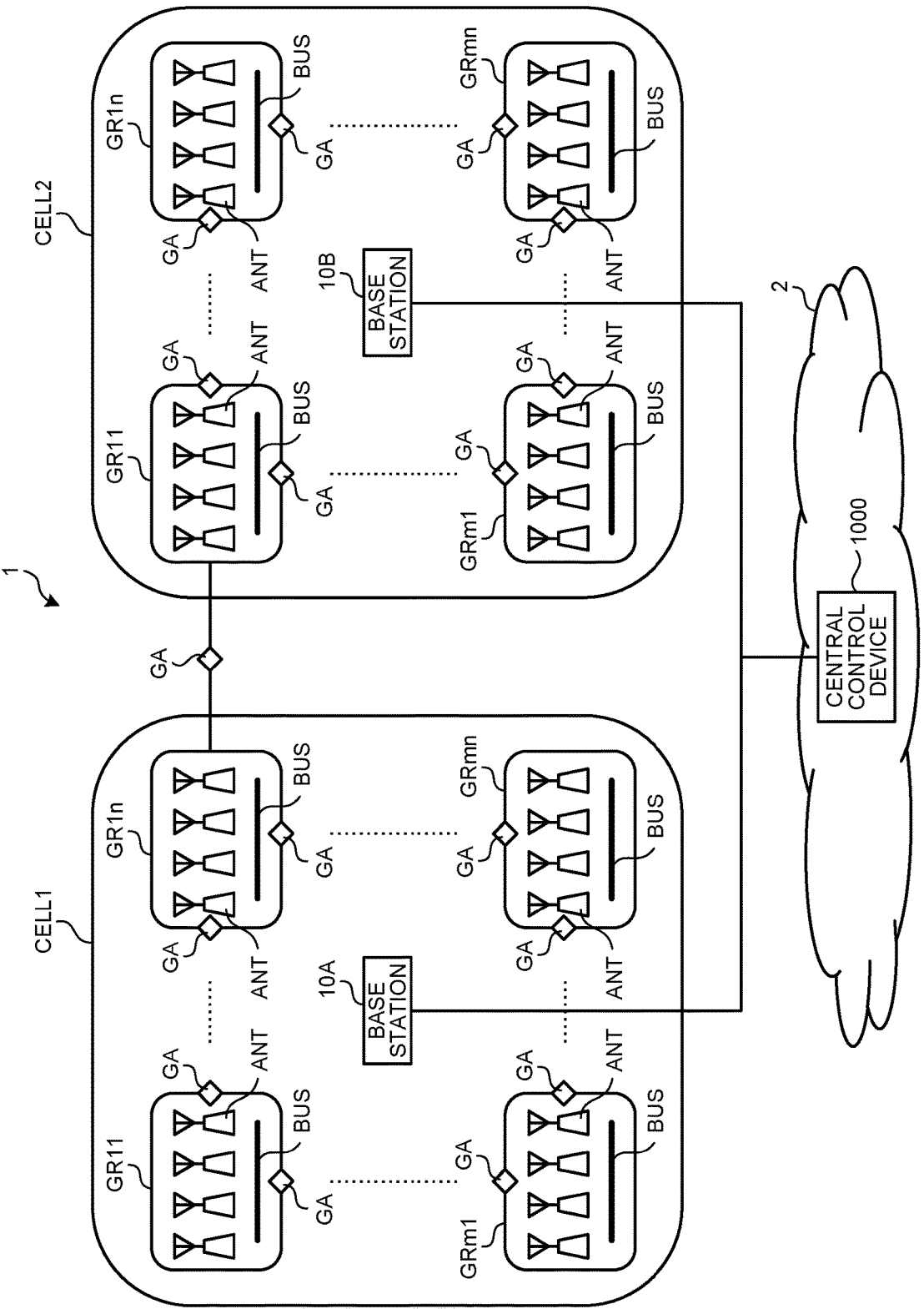
FIG. 1 is a diagram illustrating a configuration of a network system according to an embodiment.

FIG. 1 is a diagram illustrating a configuration of a network system according one embodiment of the present disclosure. A network system 1 is an electricity and communication integrated network in which a wireless communication network that includes a base station 10A, a base station 10B, and a plurality of antennas ANT and that conforms to the fifth-generation of mobile communication system (5G) and a power network that includes a plurality of direct-current grids GR11 to GRmn that are power grids are integrated.

The base station 10A and the base station 10B are wireless base stations that form a 5G wireless communication network. Meanwhile, 5G has features of "ultra-high speed", "ultra-low latency", and "massive simultaneous connectivity". As for "ultra-low latency", for example, one millisecond or less is ensured as communication latency. The standard of the wireless communication is not limited to 5G, and a communication standard for the next generation of mobile communication systems, the next generation after 5G, which is called as Beyond (B) 5G may be adopted. A communication standard that ensures communication latency is more preferable. The base station 10A forms, by the plurality of antennas ANT, a communication area CELL1 that enables communication with a wireless terminal that performs 5G wireless communication, and the base station 10B forms, by the plurality of antennas ANT, a communication area CELL2 that enables communication with a wireless terminal that performs 5G wireless communication. Meanwhile, the two base stations 10A and 10B are illustrated in FIG. 1, but the number of the base stations included in the network system 1 is not limited to two, and three or more base stations may be included.

The plurality of antennas ANT are arranged in the communication area CELL1 and the communication area CELL2. The antennas ANT are distributed antennas that form the 5G wireless communication network. The antennas ANT have functions as radio units (RUs) in the 5G wireless communication. Each of the antennas ANT connected to the base station 10A by an optical fiber cable forms a small cell that enables communication with a wireless terminal, and the plurality of small cells form the communication area CELLA. Each of the antennas ANT connected to the base station 10B by an optical fiber cable forms a small cell that enables communication with a wireless terminal, and the plurality of small cells form the communication area CELL2.

Figure 2:
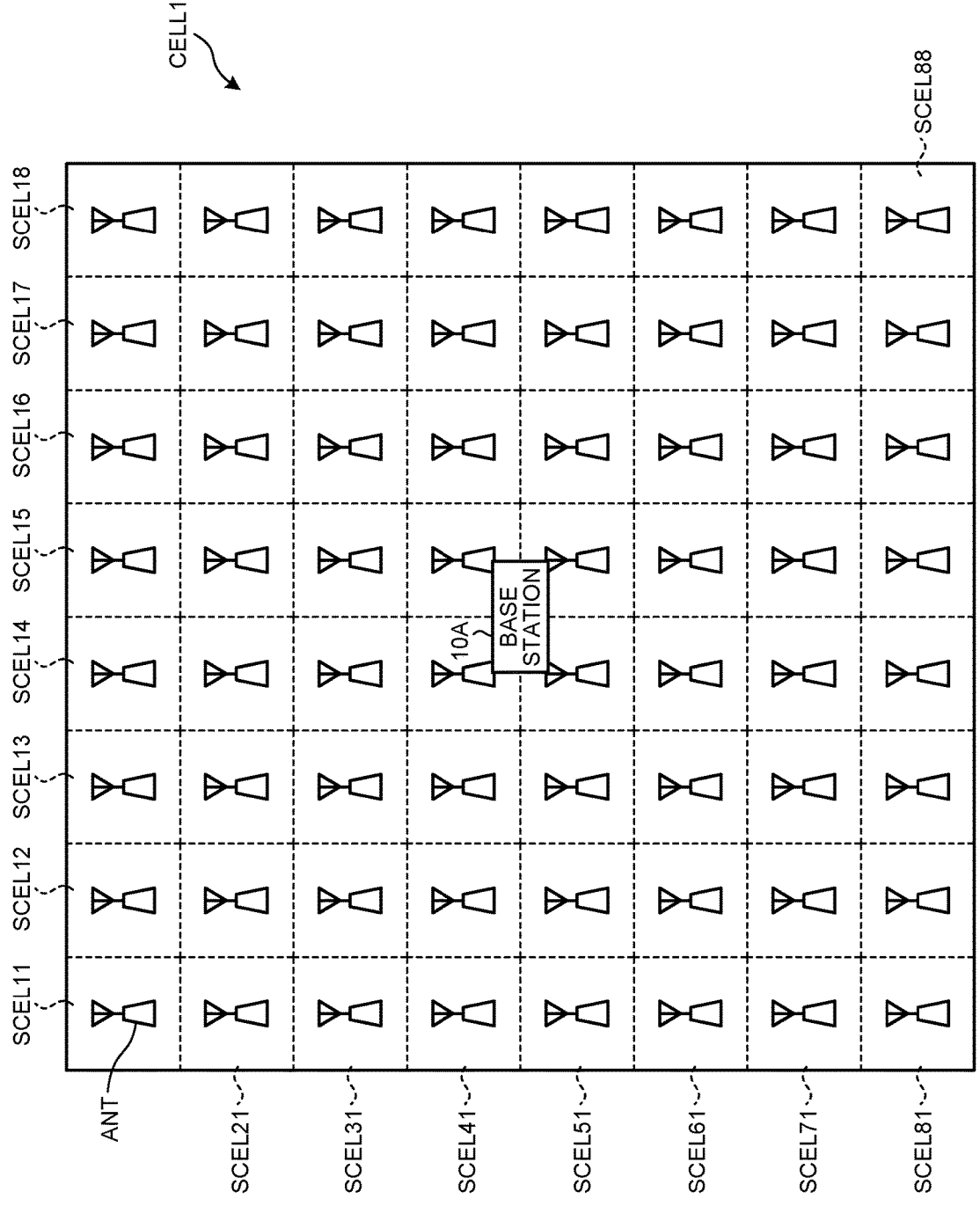
FIG. 2 is a schematic diagram of small cells that are formed by antennas.

FIG. 2 is a schematic diagram illustrating the communication area CELLA that corresponds to the base station 10A and small cells SCEL11 to SCEL88 that are formed by the antennas ANT connected to the base station 10A. Meanwhile, to prevent complicated illustration in the drawing, the optical fiber cable that connects each of the antennas ANT and the base station 10A is omitted in FIG. 2.

For example, the communication area CELL1 is an area within a radius of one kilometer (km) centered at the base station 10A, and each of the small cells SCEL11 to SCEL88 formed by the antennas ANT is an area within a radius of 125 meters (m) centered at the antenna ANT; however, in FIG. 2, the communication area CELL1 is represented by a bold square and each of the small cells SCEL11 to SCEL88 is represented by a dashed square by simplification. In the present embodiment, it is assumed that radio waves that are transmitted and received between the antennas ANT and wireless terminals are millimeter-wave bands, and the 64 antennas ANT are arranged in consideration of radio wave propagation, so that the 64 small cells SCEL11 to SCEL88 are formed. Meanwhile, the 64 antennas ANT are arranged and the 64 small cells SCEL11 to SCEL88 are formed for the base station 10B in the same manner.

Meanwhile, two-digit numbers at the ends of the reference symbols of the small cells SCEL11 to SCEL88 correspond to respective positions of the small cells SCEL11 to SCEL88 that are modeled by a matrix, where the first digits at the ends of the reference symbols correspond to positions of columns of the small cells SCEL11 to SCEL88 and the second digits at the ends of the reference symbols correspond to positions of rows of the small cells SCEL11 to SCEL88. For example, in FIG. 2, the cell in the second row and the second column is referred to as the small cell SCEL22.

Referring back to FIG. 1, in the communication area CELL1 and the communication area CELL2, buses BUS are installed in communication areas each being formed by the plurality of antennas ANT that are determined in advance. The bus BUS that forms a direct-current grid is a direct-current power line to which a plurality of power devices including a power generator and a power storage device are connected. In the present embodiment, the single bus BUS is installed in each of the communication areas each being formed by the four adjacent antennas ANT. In the communication area CELL1 and the communication area CELL2, direct-current grids GR11 to GRmn that are direct-current power grids are formed by the plurality of buses BUS.

Figure 3:
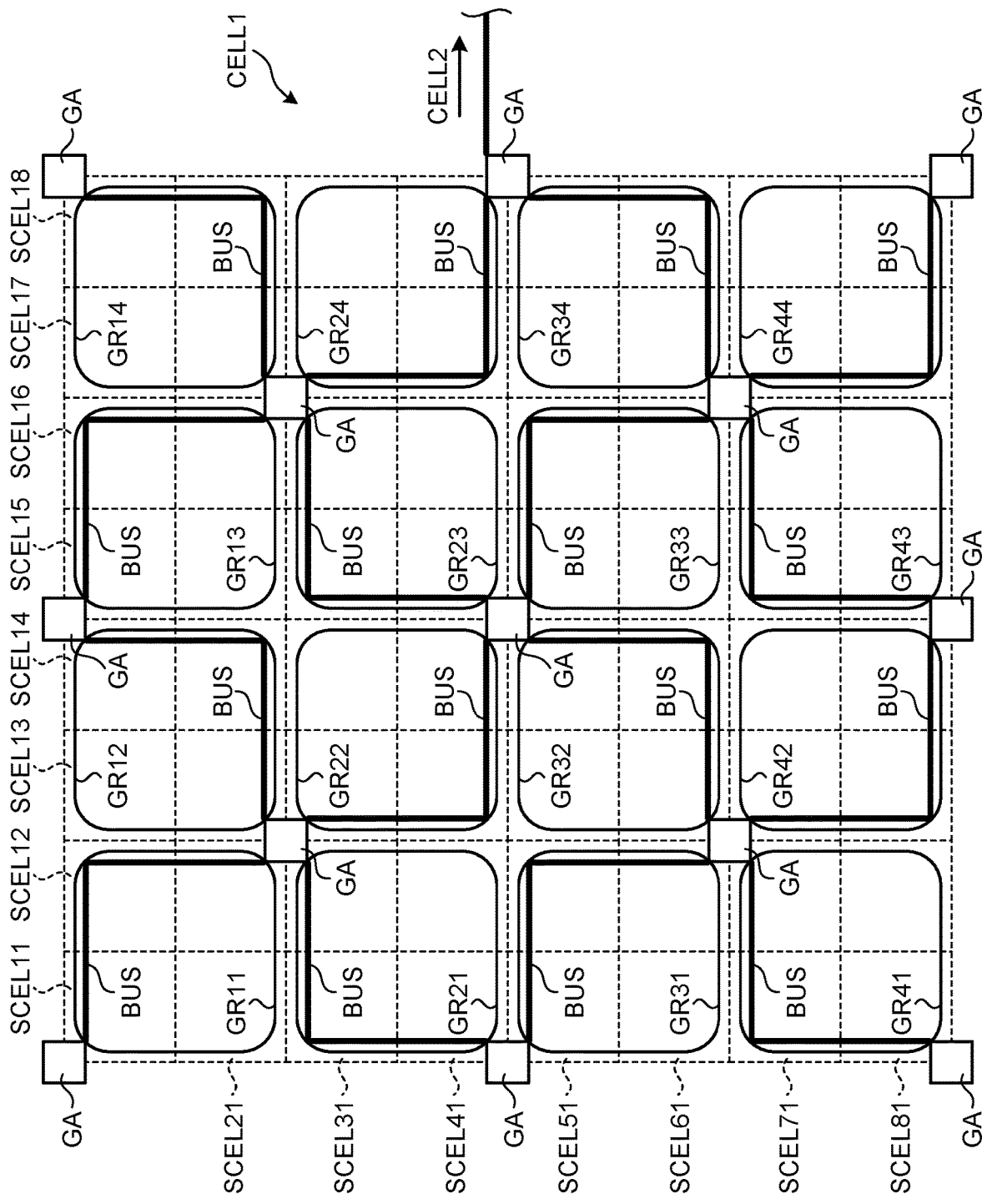
FIG. 3 is a diagram schematically illustrating bus-shaped direct-current grids and small cells arranged in a communication area.

FIG. 3 is a diagram schematically illustrating the 16 buses BUS that are arranged in the communication area CELL1, the direct-current grids GR11 to GR44 that are formed by the 16 buses BUS, and the small cells that cover the respective areas of the direct-current grids GR11 to GR44. Meanwhile, in FIG. 3, the direct-current grids GR11 to GR44 are modeled by a matrix of m rows and n columns, and the base station 10A is omitted to prevent complicated illustration in the drawing. Two-digit numbers at the ends of the reference symbols of the direct-current grids GR11 to GR44 correspond to respective positions of the direct-current grids GR11 to GR44 that are modeled by a matrix of 4 rows and 4 columns, where the first digits at the ends of the reference symbols correspond to positions of columns of the direct-current grids GR11 to GR44 and the second digits at the ends of the reference symbols correspond to positions of rows of the direct-current grids GR11 to GR44. For example, in FIG. 3, the direct-current grid in the second row and the second column is referred to as the direct-current grid GR22. Each of the direct-current grids GR11 to GR44 illustrated in FIG. 3 is one example of a bus-shaped direct-current grid.

The buses BUS have baseline lengths of, for example, 1 km, are bent and arranged in a matrix of 4 rows and 4 columns, and form the direct-current grids GR11 to GR44. The buses BUS supply power at voltage of 400 volts (V), for example. Meanwhile, in FIG. 3, in areas of the small cells in which the buses BUS are not located, power is supplied by branch lines (not illustrated) that are extended from the buses BUS, for example. In each of the direct-current grids GR11 to GR44, wireless communication is covered by a communication area that is formed of the small cells in a matrix of 2 rows and 2 columns, and the bus BUS supplies power to the antennas ANT. For example, the wireless communication of the direct-current grid GR11 is covered by the small cell SCEL11, the small cell SCEL12, the small cell SCEL21, and the small cell SCEL22, and the bus BUS that forms the direct-current grid GR11 supplies power to the antenna ANT that forms the small cell SCEL11, the antenna ANT that forms the small cell SCEL12, the antenna ANT that forms the small cell SCEL21, and the antenna ANT that forms the small cell SCEL22.

Figure 4:
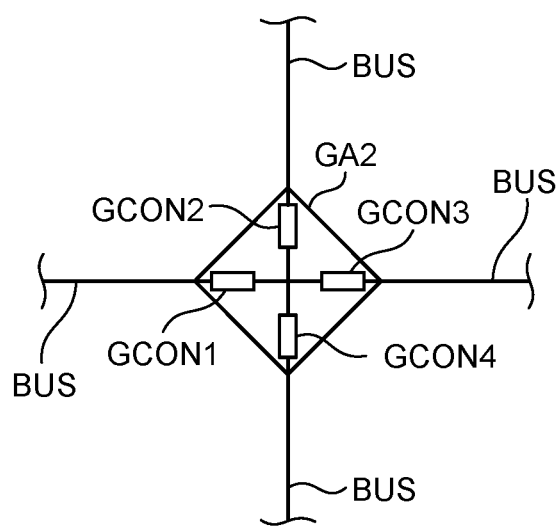
FIG. 4 is a schematic diagram illustrating a configuration of a power gate.

Power gates GA that interchange power among the direct-current grids is arranged among the direct-current grids. FIG. 4 is a schematic diagram illustrating a configuration of the power gate GA. The power gate GA includes four DC/DC converters GCON1 to GCON4. The DC/DC converters GCON1 to GCON4 are configured such that one ends are connected to the single bus BUS and the other ends are connected to one another. Meanwhile, the power gate GA may include a DC/DC converter that is not connected to the bus BUS, depending on a positional relationship with the direct-current grids GR11 to GR44. Further, at least one of the power gates GA arranged in the single communication area is connected to the power gate GA that is arranged in the different communication area CELL2, and interchanges power across the communication areas. Meanwhile, the number of the DC/DC converters included in the power gate GA may be determined in accordance with the number of the connected buses BUS. The power gates GA have functions of 5G wireless communication, function as wireless terminals, and perform information communication with an MEC server 101 (to be described later) via the antennas ANT.

Referring back to FIG. 1, a cloud system 2 is a system that provides various kinds of services via a network, such as the Internet, and includes a central control device 1000. The central control device 1000 is connected to the base station 10A and the base station 10B. The central control device 1000 is a server device that has a function to control power interchange among the direct-current grids GR11 to GR44 included in the communication area CELL1 and the direct-current grids GR11 to GR44 included in the communication area CELL2.

Figure 5:
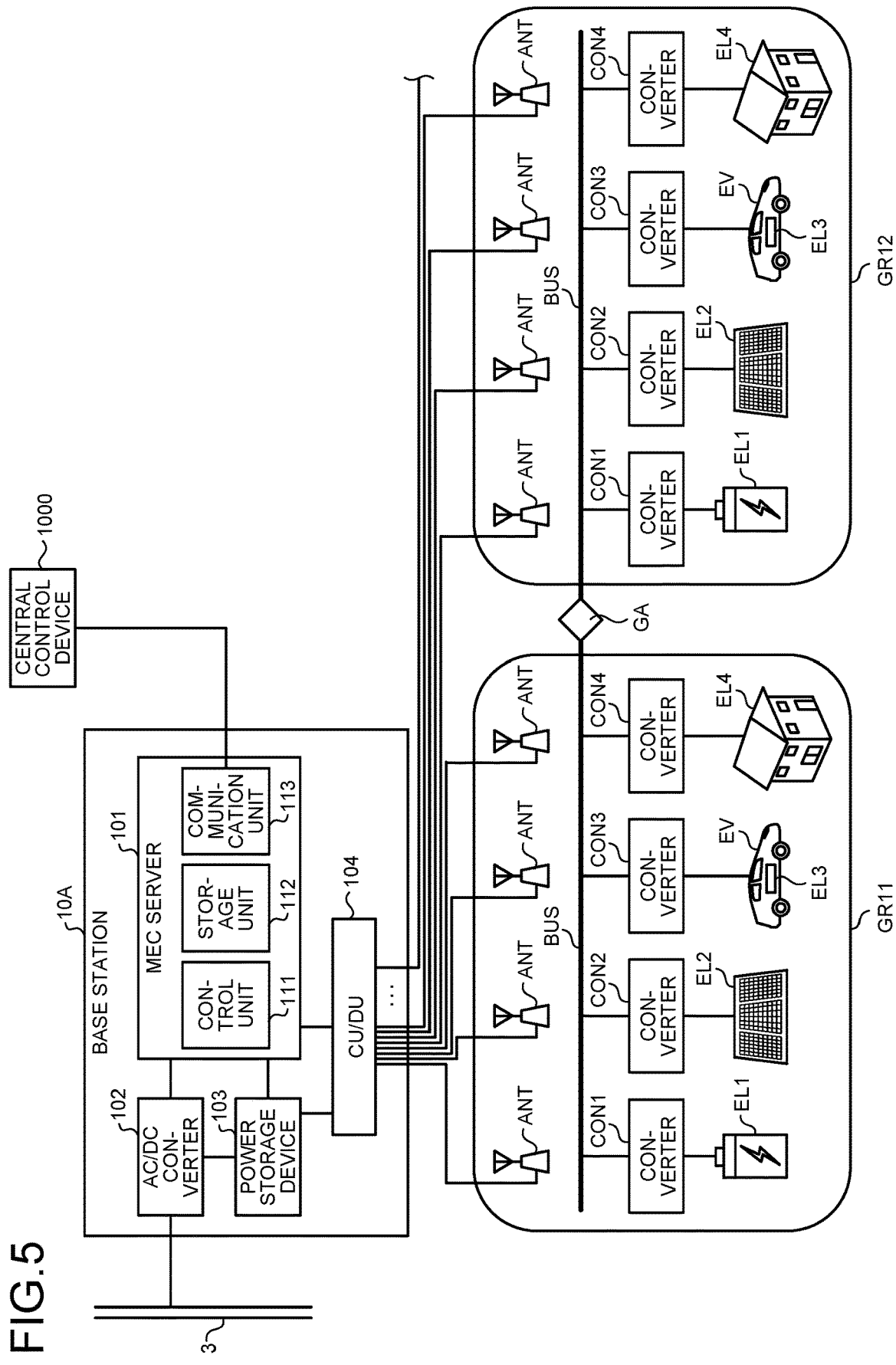
FIG. 5 is a diagram illustrating configurations of a base station and the direct-current grids.

FIG. 5 is a diagram illustrating an example of configurations of the base station 10A and the direct-current grids GR11 and GR12. Meanwhile, the base station 10B has the same configuration as the base station 10A, and therefore, in FIG. 5, the configuration of the base station 10A is illustrated as a representative and the configuration of the base station 10B is omitted. Further, in FIG. 5, to prevent complicated illustration in the drawing, the configurations of the direct-current grids GR11 and the direct-current grid GR12 are illustrated as representatives among the direct-current grids GR11 to GR44 that are included in the communication area CELL1 corresponding to the base station 10A.

The base station 10A includes the MEC server 101, an AC/DC converter 102, a power storage device 103, and a CU/DU 104. Each of the direct-current grid GR11 and the direct-current grid GR12 includes the bus BUS, converters CON1 to CON4, and power elements EL1 to EL4, and wireless communication of each of the direct-current grid GR11 and the direct-current grid GR12 is covered by a communication area that is formed of the four antennas ANT.

The configuration of the base station 10A will be first described below. The AC/DC converter 102 is connected to a commercial power system 3. The AC/DC converter 102 converts alternating-current power supplied from the power system 3 to direct-current power, and supplies the direct-current power to the MEC server 101 and the power storage device 103.

The power storage device 103 includes one or more power storage batteries. A power generator, such as a renewable energy source, may be connected to the power storage device 103. The power that is stored in the power storage device 103 is supplied, as driving power, to the MEC server 101 and the CU/DU 104. Further, the power storage device 103 may supply power to the antennas ANT via a metal cable.

The CU/DU 104 has a function as a central unit (CU) and a function as a distributed unit (DU) in 5G communication. The CU/DU 104 is connected to the plurality of antennas ANT that form the communication areas by optical fiber cables. Further, the CU/DU 104 is connected to the MEC server 101.

The MEC server 101 that is one example of a control device is a mobile edge computing (MEC) server device that is installed at a position near a wireless terminal. The MEC server 101 includes a control unit 111, a storage unit 112, and a communication unit 113.

The control unit 111 performs various kinds of arithmetic processing for implementing functions of the MEC server 101, and includes a processor, such as a central processing unit (CPU), an application specific integrated circuit (ASIC), a field-programmable gate array (FPGA), a digital signal processor (DSP), or a graphics processing unit (GPU). Functions of the control unit 111 are implemented by causing the control unit 111 to read various programs from the storage unit 112 and execute the various programs. For example, the control unit 111 reads various programs from the storage unit 112 and executes the various programs, so that a function to perform information communication with the converters CON1 to CON4 and the power elements EL1 to EL4 and integrally manage states of the direct-current grids GR11 to GR44 installed in the communication area CELL1, a function to integrally control the converters CON1 to CON4, a function to interchange power among the direct-current grids GR11 to GR44, a function to control power interchange with the direct-current grids installed in an adjacent communication area in accordance with an instruction given by the central control device 1000, and the like are implemented.

The storage unit 112 includes, for example, a read only memory (ROM) for storing various programs, data, and the like that are used by the control unit 111 to perform arithmetic processing. Further, the storage unit 112 includes, for example, a random access memory (RAM) that is used as an operating space by the control unit 111 to perform arithmetic processing or that is used to store results of the arithmetic processing performed by the control unit 111. The storage unit 112 may include an auxiliary storage device, such as a hard disk drive (HDD) or a solid state drive (SSD).

The communication unit 113 includes a communication module that performs information communication in a wired or wireless manner. The communication unit 113 is connected to the central control device 1000. The communication unit 113 performs information communication with the central control device 1000 via the Internet.

The configurations of the direct-current grids GR11 and GR12 will be described below. The power element EL1 is, as one example, a stationary power storage device that is able to supply, consume, and charge power, and is connected to the converter CON1. The stationary power storage device is one example of an in-facility power storage device that is permanently installed. The converter CON1 has a function to convert voltage of direct-current power supplied by the power element EL1 and output the converted one to the bus BUS and a function to convert voltage of direct-current power supplied by the bus BUS and output the converted one to the power element EL1 for charging.

The power element EL2 is, as one example, a solar power generation device that is able to generate and supply power, and is connected to the converter CON2. The solar power generation device is one example of a power generation device that generates power by using renewable energy. The converter CON2 has a function to convert voltage of direct-current power supplied by the power element EL2 and output the converted one to the bus BUS. Meanwhile, the power element EL2 is not limited to the solar power generation device, but may be a renewable source, such as a wind power generator or a geothermal power generator. Meanwhile, if the power element EL2 is an element, such as the solar power generation device, for which a power generation amount is not controlled from the viewpoint of efficiency, the converter CON2 may perform control of a maximum power point tracking (MPPT) system such that if electric power corresponding to a power generation amount is input from the power element EL2, operation is performed so that output power to the bus BUS at the power generation amount is maximum.

The power element EL3 is, as one example, an in-vehicle power storage device that is able to supply, consume, and charge power, and is connected to the converter CON3. The in-vehicle power storage device is one example of a non-stationary power storage device that is installed in the electric vehicle EV and moves. The converter CON3 has a function to convert voltage of direct-current power supplied by the power element EL3 and output the converted one to the bus BUS and a function to convert voltage of direct-current power supplied by the bus BUS and output the converted one to the power element EL3 for charging. The converter CON3 is installed in, for example, a charging station or a home charging facility, but may be installed in the electric vehicle EV.

The power element EL4 is, as one example, a net zero energy house (ZEH) that is able to supply, consume, and charge electric power, and is connected to the converter CON4. The ZEH includes, for example, a solar power generation device, a power storage battery, electrical appliance, such as an air conditioner or a refrigerator, that is a power load, and the like. The converter CON4 has a function to convert voltage of direct-current power supplied by the power element EL4 and output the converted one to the bus BUS and a function to convert voltage of direct-current power supplied by the bus BUS and output the converted one to the power element EL4 for charging a power storage battery.

The converters CON1 to CON4 include sensors for measuring electrical characteristic values of the buses BUS, and measures, as the electrical characteristic values, current values, voltage values, electric power values, and the like of the buses BUS, for example. The converters CON1 to CON4 and the power elements EL1 to EL4 are examples of a power device. Further, each of the converters CON1 to CON4 and the power elements EL1 to EL4 also functions as a wireless terminal with a function for 5G wireless communication, and performs information communication with the MEC server 101 via the single antenna ANT. For example, the power elements EL1 to EL4 transmit information on power generation capacities, power generation states, power storage capacities, power storage states, power loads, and the like to the MEC server 101, and the converters CON1 to CON4 transmit the measured electric characteristic values to the MEC server 101. Furthermore, for example, if the power element EL1 is located in the small cell SCEL11 and the power element EL2 is located in the small cell SCEL12, the power element EL1 performs communication via the antenna ANT that forms the small cell SCEL11 and the power element EL2 performs communication via the antenna ANT that forms the small cell SCEL12.

Moreover, each of the converters CON1 to CON4 in the direct-current grids GR11 to GR44 is controlled by an energy management system (EMS). The EMS may have the same hardware configuration as the MEC server 101. The EMS is one example of a control device. The EMS is arranged in accordance with each of the direct-current grids GR11 to GR44, for example. The EMS may be arranged in the MEC server 101 in a virtualized manner. The EMS controls the converters CON1 to CON4 such that power in the buses BUS is smoothed in accordance with reception of power with respect to the power elements EL1 to EL4. In the direct-current grids GR11 to GR44, power generation capacities, power generation states, power storage capacities, power storage states, power loads, and the electric characteristic values of the buses BUS vary from moment to moment; however, each of the EMSs controls each of the converters CON1 to CON4 in the direct-current grids GR11 to GR44, so that it is possible to cancel out the variation, it is possible to smooth power in the buses BUS, and it is possible to stabilize power supply and demand in each of the direct-current grids GR11 to GR44. Meanwhile, as a control method in the direct-current grids GR11 to GR44, for example, various control methods, such as feedback control, are applicable.

Furthermore, in the present embodiment, when power shortage occurs in a certain direct-current grid installed in the communication area CELL1, and if a different direct-current grid installed in the same communication area CELL1 has excess power, the EMS that has received distributed information on neighboring direct-current grids from the MEC server 101 controls the power gate GA, so that power is supplied from the different direct-current grid to the certain direct-current grid in which power shortage has occurred. The EMS that is arranged for each of the direct-current grids controls the power gate GA for the direct-current grid in which power shortage has occurred among neighboring direct-current grids based on information distributed by the MEC server 101, and supplies power to the direct-current grid in which power shortage has occurred. Meanwhile, in the present embodiment, the MEC server 101 may identify the direct-current grid in which power shortage has occurred based on, for example, the acquired electric characteristic value of each of the buses BUS of the direct-current grids GR11 to GR44, and control the power gate GA such that power is supplied to the identified direct-current grid. The control of interchanging power among the plurality of direct-current grids that are located adjacent to one another is one example of autonomous distributed cooperative control.

Figure 6:
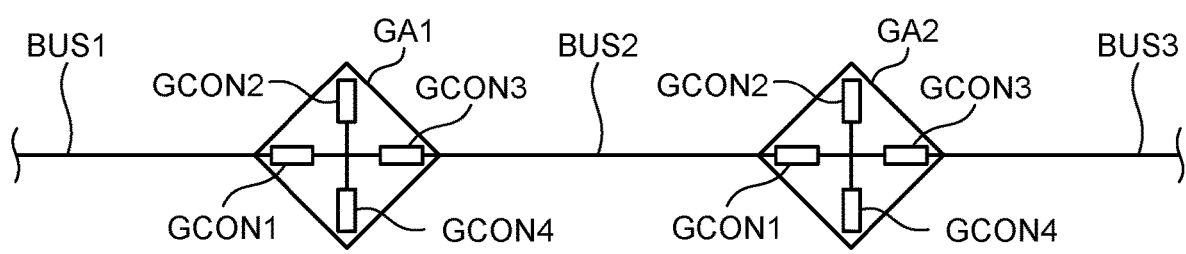
FIG. 6 is a diagram for explaining a method of interchanging power.

FIG. 6 is a diagram for explaining a method of interchanging power via the power gates GA. The buses BUS1 to BUS3 are direct-current power lines that constitute the direct-current grids as described above. The power gate GA1 is a power gate that is installed between the bus BUS1 and the bus BUS2, and the power gate GA2 is a power gate that is installed between the bus BUS2 and the bus BUS3.

For example, if power is given from the bus BUS2 to the bus BUS3, the EMS communicates with the power gate GA1 and controls the power gate GA1 such that the DC/DC converter GCON1 and the DC/DC converter GCON3 of the power gate GA1 are opened. Furthermore, the EMS communicates with the power gate GA2, and controls the power gate GA2 such that voltage of the DC/DC converter GCON1 of the power gate GA2 at the side of the DC/DC converter GCON3 is increased as compared to voltage of the DC/DC converter GCON3 of the power gate GA2 at the side of the DC/DC converter GCON1. By controlling the power gate GA1 and the power gate GA2 as described above, a path between the bus BUS1 and the bus BUS2 is blocked and power is given from the bus BUS2 to the bus BUS3.

Furthermore, for example, if power is given from the bus BUS1 to the bus BUS3, the EMS controls the power gate GA2 such that voltage of the DC/DC converter GCON1 of the power gate GA2 at the side of the DC/DC converter GCON3 is increased as compared to voltage of the DC/DC converter GCON3 of the power gate GA2 at the side of the DC/DC converter GCON1. Moreover, the EMS controls the power gate GA1 such that voltage of the DC/DC converter GCON1 of the power gate GA1 at the side of the DC/DC converter GCON3 is increased as compared to voltage of the DC/DC converter GCON3 of the power gate GA1 at the side of the DC/DC converter GCON1. By controlling the power gate GA1 and the power gate GA2 as described above, power is given from the bus BUST to the bus BUS3 via the bus BUS2, so that it is possible to give power across the direct-current grids and it is possible to smooth power supply and demand in a region of communication areas controlled by the single MEC server 101.

Meanwhile, if failures occur in the antennas ANT due to, for example, a disaster, it becomes difficult to acquire information from the power elements EL1 to EL4 and the converters CON1 to CON4 via the antennas ANT. In this case, for example, by sending a mobile base station in the form of a vehicle, it is possible to return the power elements EL1 to EL4 and the converters CON1 to CON4 to the wireless communication network at an early stage, and the EMS is able to acquire information from the power elements EL1 to EL4 and the converters CON1 to CON4 and interchange power among the direct-current grids. Furthermore, the other distributed antennas in which failures have not occurred are operating, so that it may be possible to re-connect to the other distributed antennas in which failures have not occurred and return the power elements EL1 to EL4 and the converters CON1 to CON4 to the wireless communication network at an early stage.

Moreover, in the present embodiment, the MEC server 101 may acquire information on power conditions (power generation capacities, power generation states, power storage capacities, power storage states, and power loads) or electric characteristic values from the different MEC servers 101 that are located nearby, and the EMSs may control the power gates GA such that power is interchanged in a group of a plurality of direct-current grids that are located nearby based on the acquired information. The control of power interchange in the group of a plurality of direct-current grids located nearby is one example of autonomous distributed cooperative control.

Meanwhile, the power supply and demand smoothing control in the direct-current grids GR11 to GR44 installed in the communication area does not effectively function in some cases if a balance of power supply and demand exceeds a certain limit. For example, even when the MEC server 101 or the EMS causes each of the converters CON1 to CON4 in the direct-current grids GR11 to GR44 to operate so as to smooth power supply and demand, if power generation amounts, power consumption amounts, power load variation amounts, or the like that are adjustable by the direct-current grids GR11 to GR44 are exceeded, there is a need to interchange power exceeding a range that may be supplied by the direct-current grids GR11 to GR44.

If the central control device 1000 determines that the autonomous distributed cooperative control is not effectively implemented, power interchange is changed from the autonomous distributed cooperative control that is performed by the MEC server 101 or the EMS to centralized control in which the central control device 1000 controls power interchange between direct-current grid groups or between a plurality of direct-current grid groups that are located close to one another and a different direct-current grid group. In the case of the centralized control as described above, in the network system 1, the central control device 1000 controls power interchange from one of the communication area CELL1 and the communication area CELL2 to the other one of the communication area CELL1 and the communication area CELL2. Specifically, when power shortage occurs in a certain direct-current grid that is installed in the communication area CELL1 or the communication area CELL2, and if a certain direct-current grid installed in one of the communication areas has excess power capacity, the central control device 1000 controls the MEC server 101 of the base station 10A and the MEC server 101 of the base station 10B, and power is given from the certain direct-current grid to the direct-current grid in which power shortage has occurred.

For example, the central control device 1000 acquires the information on the power generation capacities, the power generation states, the power storage capacities, the power storage states, the power loads, and the like that the MEC server 101 have acquired from the power elements EL1 to EL4, and the information on the power characteristic values of the buses BUS that are acquired from the converters CON1 to CON4. The central control device 1000 identifies a direct-current grid in which power shortage has occurred based on the acquired information, and gives an instruction, to the MEC server 101 of the base station 10A and the MEC server 101 of the base station 10B, to give power to the identified direct-current. The MEC server 101 of the base station 10A and the MEC server 101 of the base station 10B give instructions on power interchange to the EMSs of the direct-current grids GR11 to GR44 that are managed by the corresponding MEC servers, in accordance with the instruction given by the central control device 1000. The EMS controls the power gate GA that is located on a path from the bus BUS of the direct-current grid that supplies power to the bus BUS of the direct-current grid that receives the power among the power gates GA in the communication area. Accordingly, it is possible to realize smoothing of power supply and demand between the direct-current grids that are installed in the different communication areas.

According to the present embodiment, by installing, for example, a mobile base station that promptly complements the wireless communication network, even if failures occur in the antennas ANT that cover the areas of the direct-current grids GR11 to GR44, it is possible to cause the power elements EL1 to EL4 or the converters CON1 to CON4 included in the direct-current grids GR11 to GR44 to return to the wireless communication network, so that resilience is increased as compared to the power network system disclosed in International Publication NO. WO2013/172088. Furthermore, according to the present embodiment, even if a disaster occurs, autonomous distributed control is performed in each of the direct-current grids GR11 to GR44, so that it is possible to operate the direct-current grids GR11 to GR44. Moreover, according to the present embodiment, even if a disaster occurs, the base stations 10A and 10B and the direct-current grids GR11 to GR44 operate with the aid of power batteries or power generation facilities, so that it is possible to interchange power in the communication area and resilience is increased as compared to the power network system disclosed in International Publication NO. WO2013/172088.

Modification

Thus, the embodiment of the present disclosure has been described above, but the present disclosure is not limited to the embodiments as described above and may be embodied in various different forms. For example, the present disclosure may be implemented by modifying the above-described embodiment as described below. Meanwhile, the embodiment as described above and the modifications as described below may be combined with each other. The present disclosure includes configurations made by an appropriate combination of the embodiment as described above and the modifications. Furthermore, additional advantages and modifications will readily occur to those skilled in the art. Therefore, the disclosure in its broader aspects is not limited to embodiment as described above and the modifications, and various modifications may be made.

Figure 7:
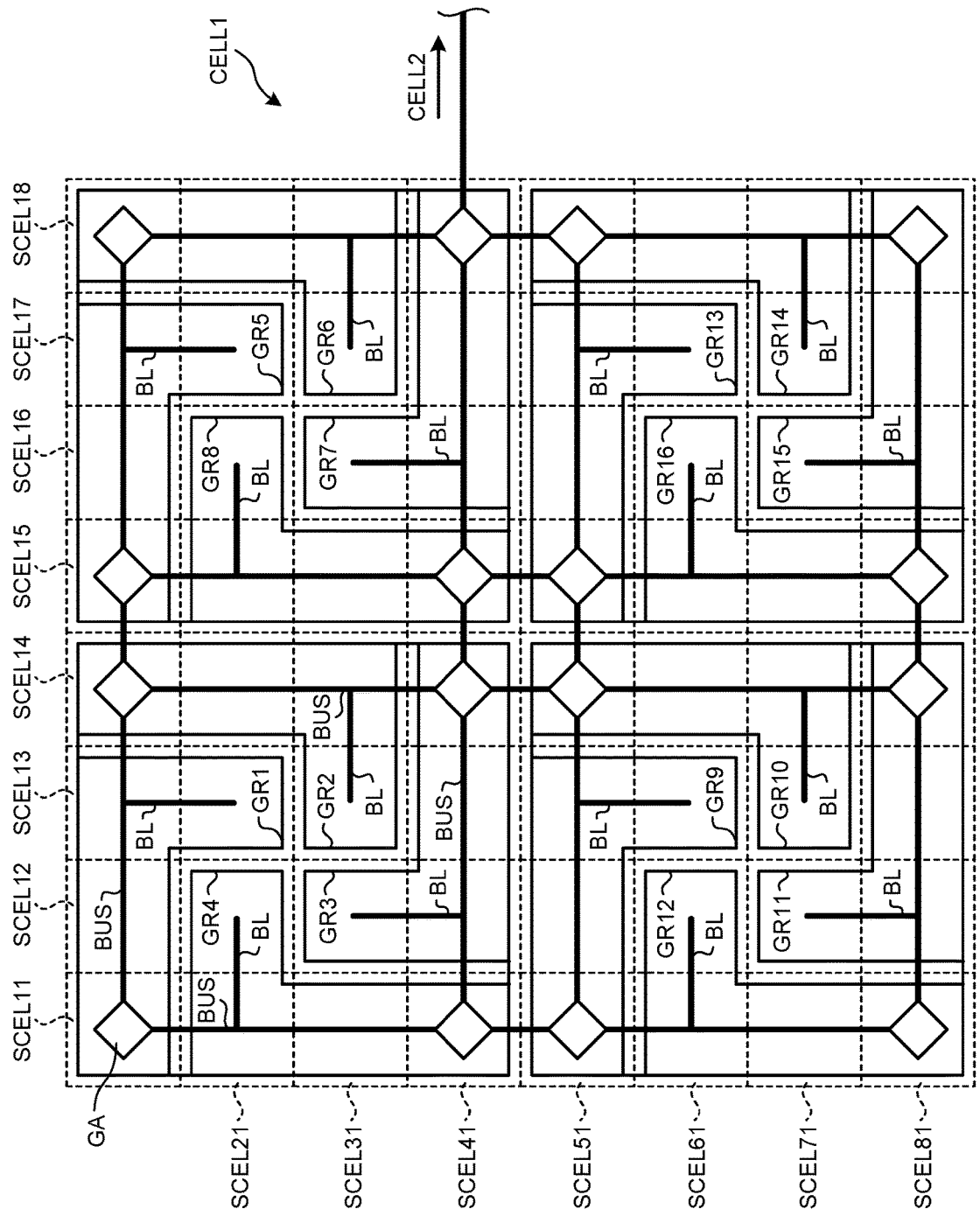
FIG. 7 is a diagram illustrating arrangement of star-shaped direct-current grids.

FIG. 7 is a diagram illustrating arrangement of star-shaped direct-current grids. In a configuration illustrated in FIG. 7, the buses BUS are arranged with straight lengths of 1 kilometer (km) and connected to branch lines BL, and the direct-current grids GR1 to GR16 are formed by the buses BUS and the branch lines BL. Wireless communication of each of the direct-current grids GR1 to GR16 is covered by a communication area that is formed by a small cell along the buses BUS and the branch lines BL. Even in the configuration illustrated in FIG. 7, the power gates GA that interchange power among the direct-current grids are arranged among the direct-current grids. Meanwhile, the power gates GA are connected by cables that connect the power gates GA. Each of the direct-current grids GR1 to GR16 is one example of a star-shaped direct-current grid.

Figure 8:
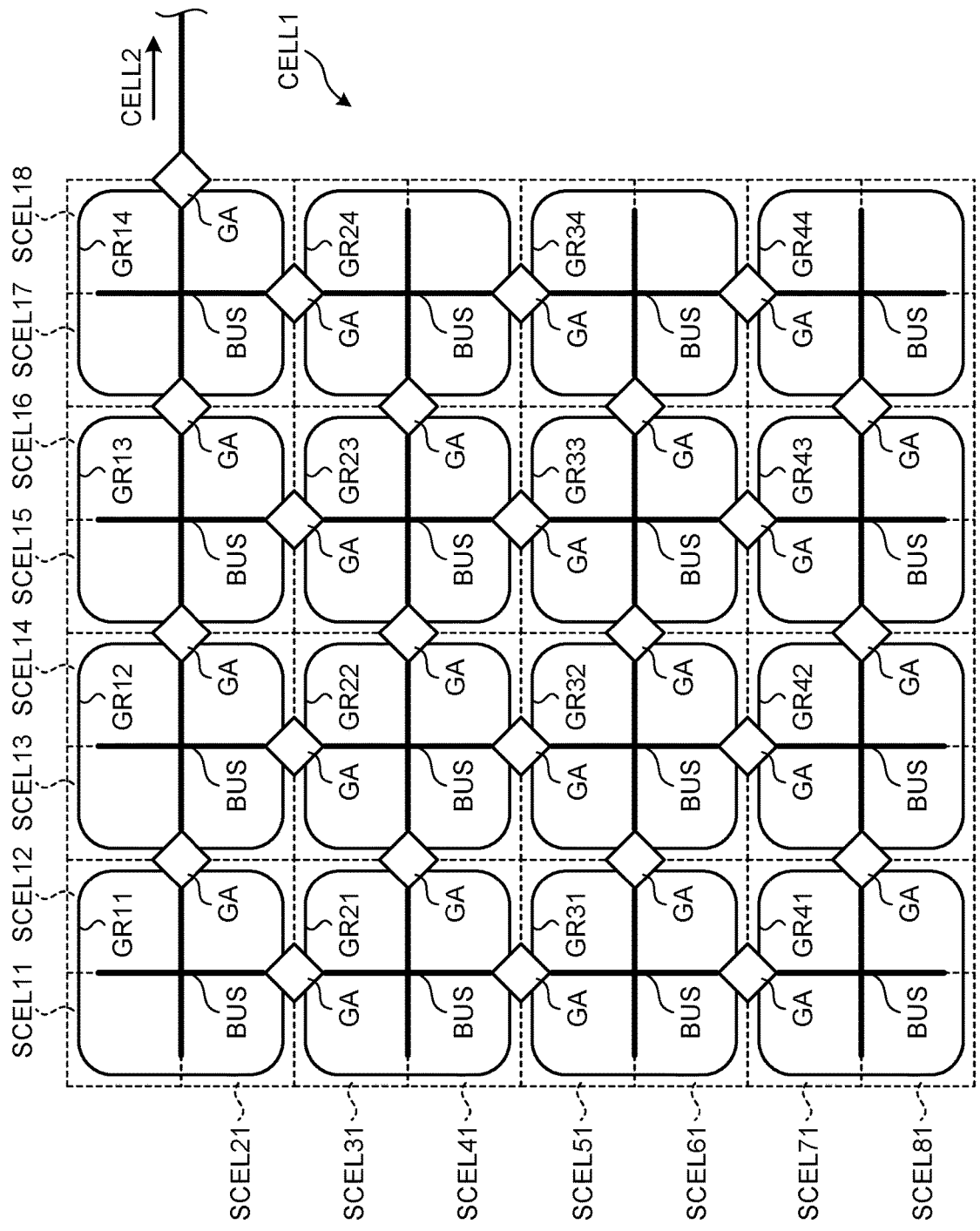
FIG. 8 is a diagram illustrating arrangement of star-shaped direct-current grids.

FIG. 8 is a diagram illustrating arrangement of star-shaped direct-current grids. In a configuration illustrated in FIG. 8, the buses BUS are arranged in star shapes and entire lengths are 1 km. In the configuration illustrated in FIG. 8, the buses BUS are arranged in a matrix of four rows and four columns in the communication area CELL1 and form the direct-current grids GR11 to GR44. Wireless communication of each of the direct-current grids GR11 to GR44 is covered by a communication area formed by small cells in a matrix of two rows and two columns. Even in the configuration illustrated in FIG. 8, the power gates GA that interchange power among the direct-current grids are arranged among the direct-current grids. Each of the direct-current grids GR11 to GR44 illustrated in FIG. 8 is one example of a star-shaped direct-current grid. Meanwhile, in the configuration illustrated in FIG. 8, the single power gate GA is arranged to interchange power with the direct-current grids in the adjacent communication area, but the number of the power gates GA is not limited to one. In the communication area CELL1, it may be possible to arrange the power gates GA for interchanging power with the direct-current grids in the adjacent communication area in each of the buses BUS that form the direct-current grids adjacent to the direct-current grids in the adjacent communication area.

Figure 9:
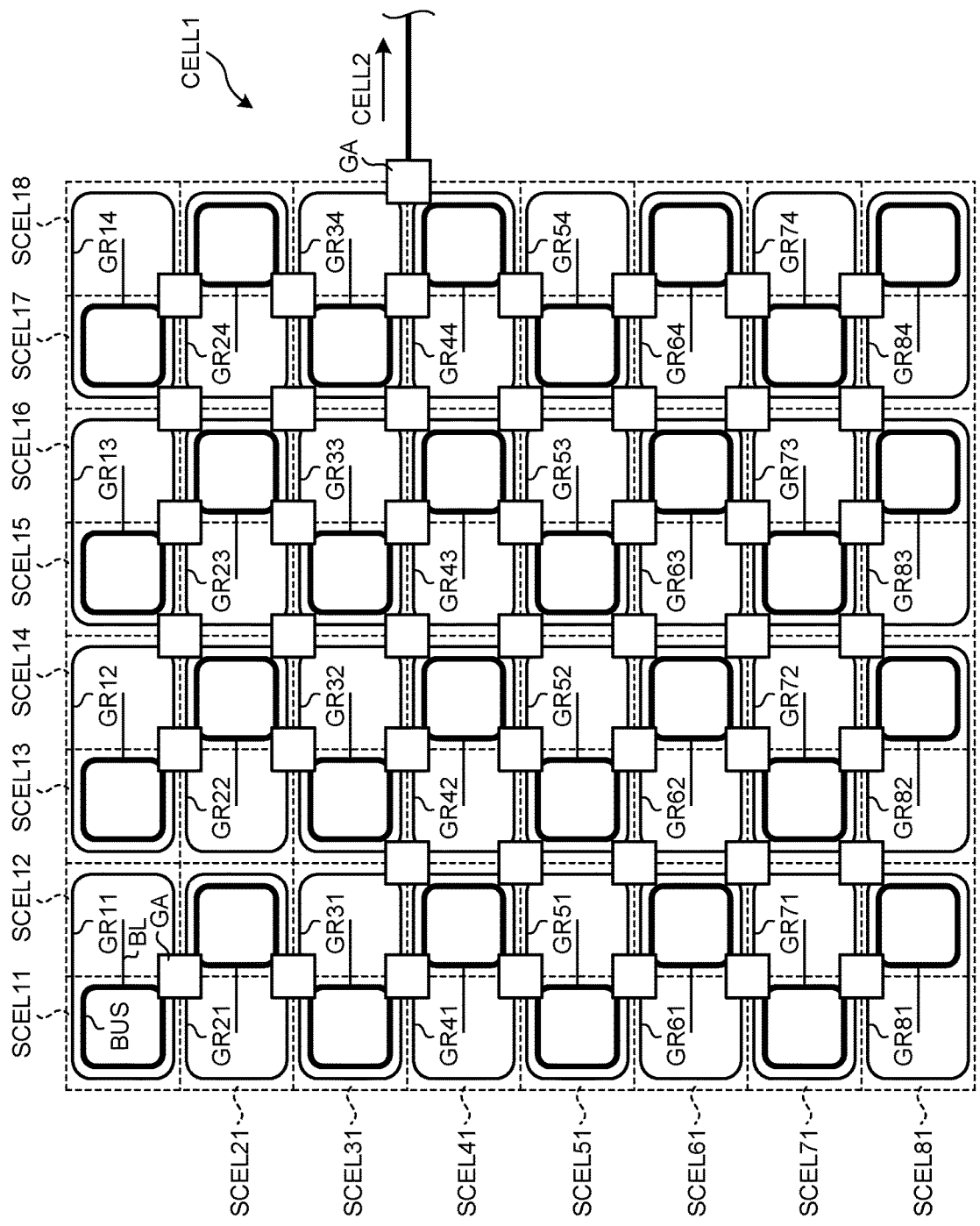
FIG. 9 is a diagram illustrating arrangement of ring-shaped direct-current grids.

FIG. 9 is a diagram illustrating arrangement of ring-shaped direct-current grids. In a configuration illustrated in FIG. 9, the buses BUS are arranged in ring shapes and entire lengths are 1 km. In the configuration illustrated in FIG. 9, the buses B are arranged in a matrix of eight rows and eight columns in the communication area CELL1 and form the direct-current grids GR11 to GR84. Wireless communication of each of the direct-current grids GR11 to GR84 is covered by a communication area formed by small cells in a matrix of one row and two columns. Each of the direct-current grids GR11 to GR84 illustrated in FIG. 9 is one example of a ring-shaped direct-current grid. Even in the configuration illustrated in FIG. 9, the power gates GA that interchange power among the direct-current grids are arranged among the direct-current grids. Meanwhile, in the configuration illustrated in FIG. 9, the single power gate GA is arranged to interchange power with the direct-current grids in the adjacent communication area, but the number of the power gates GA is not limited to one. In the communication area CELL1, it may be possible to arrange the power gates GA for interchanging power with the direct-current grids in the adjacent communication area in each of the buses BUS that form the direct-current grids adjacent to the direct-current grids in the adjacent communication area.

Even in the configurations illustrated in FIGS. 7 to 9, even if a disaster occurs, autonomous distributed control is performed in each of the direct-current grids, so that it is possible to operate the direct-current grids and interchange power in the communication area. Furthermore, by installing, for example, a mobile base station that promptly complements the wireless communication network, even if failures occur in the antennas ANT that cover the areas of the direct-current grids, for example, it is possible to cause the power elements EL1 to EL4 or the converters CON1 to CON4 included in the direct-current grids to return to the wireless communication network. Meanwhile, the arrangement of the buses BUS is not limited to the arrangement examples illustrated in the drawings, and the bend arrangement, the straight-line arrangement, the cross-shaped arrangement, and the ring-shaped arrangement illustrated in FIGS. 3 and 7 to 9 may be combined. For example, it may be possible to form a mesh-shaped direct-current grid by combining the straight-line arrangement and the cross-shaped arrangement, or it may be possible to form a mesh-shaped direct-current grid by combining the straight-line arrangement.

Figure 10:
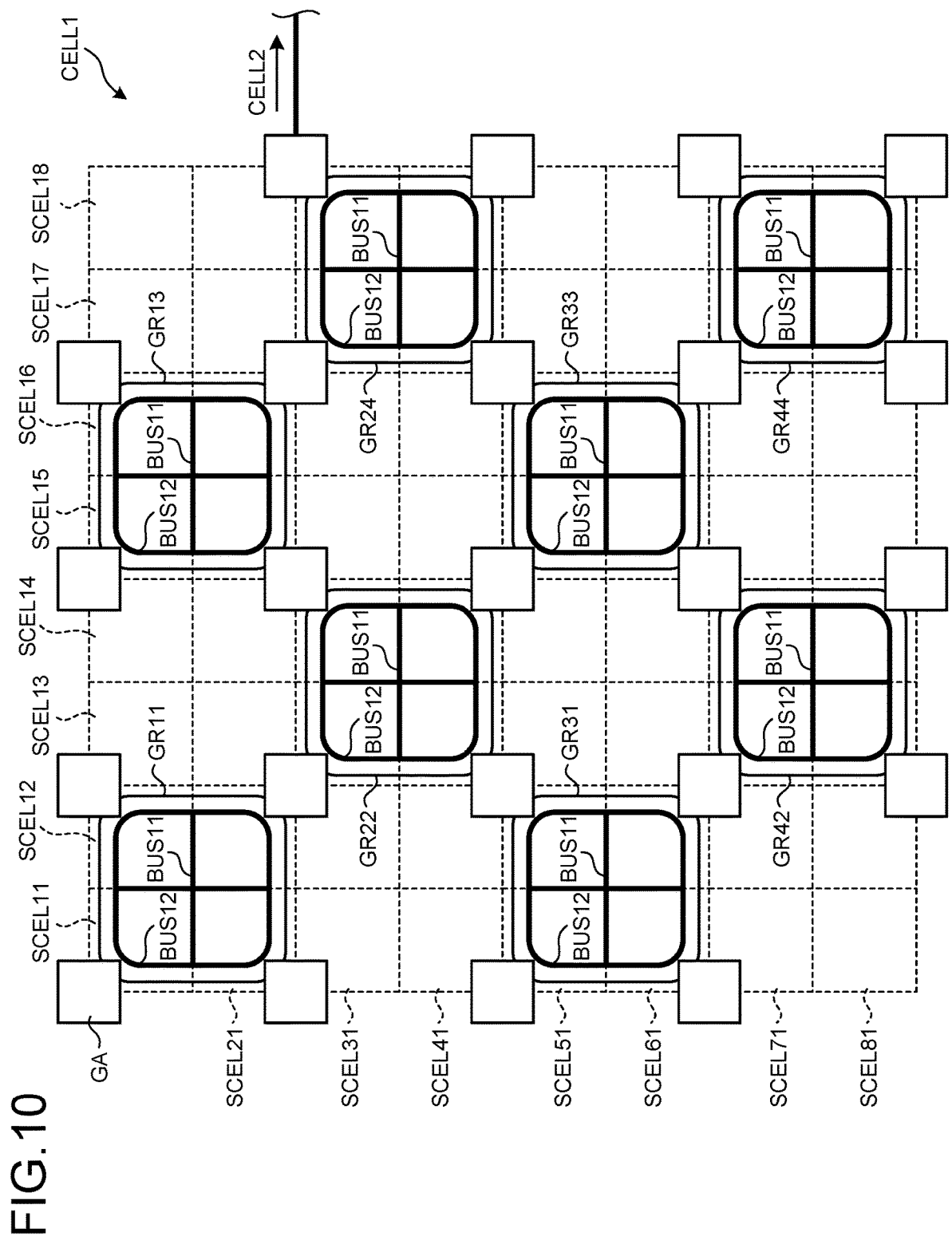
FIG. 10 is a diagram illustrating arrangement of mesh-shaped direct-current grids.

FIG. 10 is a diagram illustrating an example of an example of arrangement of mesh-shaped direct-current grids. The buses BUS11 are buses that are arranged in a star-shaped manner, and the buses BUS12 are buses that are arranged in a ring-shaped manner. The buses BUS11 and the buses BUS12 are connected to one another, and a single direct-current grid is formed of the single bus BUS11 and the single bus BUS12. Meanwhile, areas in which the buses BUS11 and the buses BUS12 are not arranged in FIG. 10 are supplied with power from areas in which the buses BUS11 and the buses BUS12 are arranged. For example, power is supplied from the bus BUS11 and the bus BUS12 that form the direct-current grid GR11 into the small cell SCEL13 and the small cell SCEL23, and power is supplied from the bus BUS11 and the bus BUS12 that form the direct-current grid GR13 into the small cell SCEL14 and the small cell SCEL24. Even in the configuration illustrated in FIG. 10, the power gates GA that interchange power among the direct-current grids are arranged among the direct-current grids. Each of the direct-current grids illustrated in FIG. 10 is one example of a mesh-shaped direct-current grid.

FIG. 11 is a diagram illustrating an example of arrangement of mesh-shaped direct-current grids. The buses BUS11 are buses that are arranged in a star-shaped manner, and the buses BUS12 are buses that are arranged in a ring-shaped manner. The buses BUS11 and the buses BUS12 are connected to one another, and a single direct-current grid is formed of the single bus BUS11 and the single bus BUS12. In the configuration illustrated in FIG. 11, the buses BUS11 are arranged along diagonal lines of the buses BUS12. Meanwhile, even in the configuration illustrated in FIG. 11, power is supplied from the areas in which the buses BUS11 and the buses BUS12 are arranged to areas in which the buses BUS11 and the buses BUS12 are not arranged. For example, power is supplied from the bus BUS11 and the bus BUS12 that form the direct-current grid GR11 into the small cell SCEL13 and the small cell SCEL23, and power is supplied from the bus BUS11 and the bus BUS12 that form the direct-current grid GR13 into the small cell SCEL14 and the small cell SCEL24. Even in the configuration illustrated in FIG. 11, the power gates GA that interchange power among the direct-current grids are arranged among the direct-current grids. Each of the direct-current grids illustrated in FIG. 11 is one example of a mesh-shaped direct-current grid.

In the embodiments as described above, the baseline lengths of the buses BUS are 1 km, but the baseline lengths are not limited to 1 km and may be shorter than 1 km or longer than 1 km. Meanwhile, if the baseline length is not equal to 1 km, the number of small cells that cover the direct-current grid that is formed by the bus BUS corresponds to the baseline length.

In the embodiments as described above, the communication area CELL1 and the communication area CELL2 have certain sizes with radii of 1 km, but the communication area CELL1 and the communication area CELL2 need not always have the sizes with the radii of 1 km, and the radii may be smaller than 1 km or larger than 1 km. Furthermore, in the embodiments as described above, the small cells SCEL11 to SCEL88 have certain sizes with radii of 125 meters (m), but the small cells need not always have the sizes with the radii of 125 m and the radii may be smaller than 125 m or larger than 125 m.

In the embodiments as described above, it may be possible to connect at least one of the buses BUS in the single communication area to the power system 3 to receive power from the power system 3 or give power to the power system 3.

In the embodiments as described above, the power elements EL1 to EL4 and the converters CON1 to CON4 may perform wireless communication with the base stations 10A and 10B if failures occur in the antennas ANT.

In the embodiments as described above, it may be possible to connect the buses BUS to the power system 3 via power converters that convert alternating current to direct current, and the MEC server 101 and the central control device 1000 may control the power converters connected to the power system 3 such that, in the autonomous distributed cooperative control or the centralized control as described above, power is interchanged among the direct-current grids and power is supplied from the power system 3.

The present disclosure is applicable to an electricity and communication integrated network system.

A network system of the present disclosure includes a wireless base station that relays communication performed by wireless terminals, a plurality of distributed antennas each being connected to the wireless base station and forming a cell that enables communication with the wireless terminals, a plurality of direct-current grids each being arranged in a predetermined form in a communication area that is formed by the plurality of cells and interchanging power with a plurality of power devices connected to the subject direct-current grid, a power gate that is arranged between the direct-current grids located adjacent to each other and interchange power between the adjacent direct-current grids, and a control device that controls the power gate based on information that is acquired from the power devices via the distributed antennas. The power devices connected to the direct-current grids perform communication with the control device via the distributed antennas that form the communication area including the direct-current grids. Even if a failure occur in a certain distributed antenna due to a disaster, the other distributed antenna in which a failure has not occurred is operating, so that it is possible to cause the power devices connected to the direct-current grid to re-connect the other distributed antenna in which the failure has not occurred and it is possible restore the power devices, so that resilience is increased.

A control method of a network system of the present disclosure is a control method of a network system including a wireless base station that relays communication performed by wireless terminals, a plurality of distributed antennas each being connected to the wireless base station and forming a cell that enables communication with the wireless terminals, a plurality of direct-current grids each being arranged in a predetermined form in a communication area that is formed by the plurality of cells and interchanging power with a plurality of power devices connected to the subject direct-current grid, a power gate that is arranged between the direct-current grids located adjacent to each other and interchange power between the adjacent direct-current grids, and a control device that controls the power gate based on information that is acquired from the power devices via the distributed antennas, where the control device acquires information transmitted from the power devices via the distributed antennas, and controls the power gate such that power interchange is performed among the direct-current grids based on the acquired information. Even if a failure occur in a certain distributed antenna due to a disaster, the other distributed antenna in which a failure has not occurred is operating, so that it is possible to cause the power devices connected to the direct-current grid to re-connect the other distributed antenna in which the failure has not occurred and it is possible to restore the power devices, so that resilience is increased.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A network system comprising:
   a wireless base station configured to relay communication performed by wireless terminals;
   a plurality of distributed antennas each being configured to be connected to the wireless base station and form a cell that enables communication with the wireless terminals;
   a plurality of direct-current grids each being arranged in a predetermined form in a communication area formed by a plurality of said cells and configured to interchange power with a plurality of power devices connected to the subject direct-current grid;
   a power gate arranged between adjacent direct-current grids which are located adjacent to each other and configured to interchange power between the adjacent direct-current grids; and
   a control device configured to control the power gate based on information acquired from the plurality of power devices via the plurality of distributed antennas, wherein
   the plurality of power devices connected to the plurality of direct-current grids are configured to perform communication with the control device via the plurality of distributed antennas that form the communication area including the plurality of direct-current grids, wherein:

a plurality of said wireless base stations are provided with one of said control devices arranged for each of the plurality of wireless base stations, the network system further comprises a central control device configured to control the control devices based on information acquired from the plurality of power devices, and the control devices are configured to control power interchange among the plurality of direct-current grids by controlling the power gates under control of the central control device.

2. The network system according to claim 1, wherein the plurality of direct-current grids are formed in a bus-shaped manner.

3. The network system according to claim 1, wherein the plurality of direct-current grids are formed in a star-shaped manner.

4. The network system according to claim 1, wherein the plurality of direct-current grids are formed in a ring-shaped manner.

5. The network system according to claim 1, wherein the plurality of direct-current grids are formed in a mesh-shaped manner.

6. A control method of a network system including: a wireless base station configured to relay communication performed by wireless terminals; a plurality of distributed antennas each being configured to be connected to the wireless base station and form a cell that enables communication with the wireless terminals; a plurality of direct-current grids each being arranged in a predetermined form in a communication area formed by a plurality of said cells and configured to interchange power with a plurality of power devices connected to the subject direct-current grid; a power gate arranged between adjacent direct-current grids located adjacent to each other and configured to interchange power between the adjacent direct-current grids; and a control device configured to control the power gate based on information acquired from the plurality of power devices via the plurality of distributed antennas, wherein a plurality of said wireless base stations are provided with one of said control devices arranged for each of the plurality of wireless base stations, the network system further comprises a central control device configured to control the control devices based on information acquired from the plurality of power devices, and the control devices are configured to control power interchange among the plurality of direct-current grids by controlling each power gate under control of the central control device, the control method comprising:

acquiring, by each control device, information transmitted from the plurality of power devices via the plurality of distributed antennas;

controlling, by the central control device, the control devices based on the information acquired from the plurality of power devices; and controlling, by each control device and each power gate such that power interchange is performed among the plurality of direct-current grids based on the acquired information under control of the central control device.

7. A network system comprising:

a wireless base station configured to relay communication performed by wireless terminals;

a plurality of distributed antennas each being configured to be connected to the wireless base station and form a cell that enables communication with the wireless terminals;

a plurality of direct-current grids each being arranged in a predetermined form in a communication area formed by the plurality of cells and configured to interchange power with a plurality of power devices connected to the subject direct-current grid;

a power gate arranged between adjacent direct-current grids which are located adjacent to each other and configured to interchange power between the adjacent direct-current grids; and a control device configured to control the power gate based on information acquired from the plurality of power devices via the plurality of distributed antennas, wherein the plurality of power devices connected to the plurality of direct-current grids are configured to perform communication with the control device via the plurality of distributed antennas that form the communication area including the plurality of direct-current grids, wherein when the power gates interchange power, the power gates are configured to increase voltage of one of the plurality of direct-current grids that supplies power as compared to voltage of one of the direct-current grids that receives power.

* * * * *